United States Patent [19]

Billing

[11] Patent Number: 5,524,091
[45] Date of Patent: Jun. 4, 1996

[54] ACCURATE DIGITAL DIVIDER

[75] Inventor: Robert Billing, Crowthorne, United Kingdom

[73] Assignee: Questech Limited, Wokingham, United Kingdom

[21] Appl. No.: 263,439

[22] Filed: Jun. 21, 1994

[30] Foreign Application Priority Data

Jun. 21, 1993 [GB] United Kingdom .................. 9312745

[51] Int. Cl.$^6$ .................................................. G06F 7/52
[52] U.S. Cl. ............................................ 364/765; 364/761
[58] Field of Search .............................. 364/715.04, 745, 364/761–767

[56] References Cited

U.S. PATENT DOCUMENTS 5,212,661  5/1993  Taniguchi ................. 364/745
5,386,376  1/1995  Girard et al. ............. 364/767
5,404,324  4/1995  Colon-Bonet .............. 364/761

*Primary Examiner*—Roy N. Envall, Jr.
*Assistant Examiner*—Chuong D. Ngu
*Attorney, Agent, or Firm*—Jacobson, Price, Holman & Stern

[57] ABSTRACT

A digital divider for forming the quotient (Q) of two numbers (A,B) includes means providing values (Q+1, Q−1) of the quotient with possible rounding errors added to or subtracted therefrom. Selector switching means is arranged to select one of the values (Q, Q+1, Q−1) under the control of a logic circuit operating according to the following rules:

$A >= 0$ and $A >= (Q+1) * B$ use $Q+1$
$A >= 0$ and $A < (Q+1) * B$ use $Q$
$A < 0$ and $A >= Q * B$ use $Q$
$A < 0$ and $A < Q * B$ use $Q-1$.

5 Claims, 1 Drawing Sheet

ACCURATE DIGITAL DIVIDER

BACKGROUND OF THE INVENTION

This invention concerns an accurate digital divider, and relates to an electronic device which is capable of forming the quotient of two numbers at high speed and without rounding errors. The device may also be adapted to provide an accurate remainder of the two numbers.

It is well known to form the quotient of two numbers a/b by using the number b to access a table of precomputed quotients k/b where k is a number larger than the largest expected b, and then multiplying to form a (k/b) which is k times the required quotient. If k is chosen to be a power of the base to which calculations are performed, the base commonly being 2 for binary numbers, then dividing by k can be achieved by discarding the least significant digits.

This method however suffers from limitations of accuracy, the quotient often being in error by 1 or 2.

SUMMARY OF THE INVENTION

It is accordingly an object of the invention to provide an accurate digital divider that overcomes the above problem. In accordance with the invention there is provided a digital electronic divider device for forming the quotient of two numbers a/b comprising a memory means having an address input for receiving the number b and providing a look up table of precomputed quotients k/b where k is a number larger than the largest expected number b and is a power of the base to which calculations are to be performed, a multiplier having a first input coupled to the output of said memory device and a second input to be addressed by the number a, and means for discarding the least significant digits of the value at the output of said multiplier, characterised in that said device further comprises means coupled to the output of said discarding means for providing a plurality of different values of the quotient a/b comprising the value from the said discarding means and that value with possible rounding errors added thereto or subtracted therefrom, selector switching means for selecting one of said plurality of different values, and a logic circuit coupled to receive digital values from selected signal paths of the device and arranged to actuate said selector switching means in order to determine an appropriate value of a/b in accordance with the relationship between the selected digital values.

Advantageously, the device in accordance with the invention is also adapted to form the remainder of the division of said two numbers a/b and comprises a further multiplier arranged to multiply one of said different values of a/b, selected in accordance with the value of a, by the value b provided at the address input of said memory means, subtractor means for subtracting the value provided at the second input of the first multiplier from the value provided at the output of the second multiplier to form a first remainder value, an adder arranged to add the value b provided at the address input of said memory means to the first reminder value provided at the output of said subtractor means, to form a second remainder value, and a second selector switching means coupled to said logic circuit and arranged to select an appropriate one of said remainder values.

In order to aid an understanding of the invention, an analysis of the process of division will be set out below.

We must first define three operators

/ which is real number division, and gives a fractional result, div which applies only to integers, and produces a result which is the real number division of its operands rounded towards minus infinity, and rem which is the remainder when two numbers are divided.

We are not concerned at this point with division by negative numbers. However, if two numbers are to be divided and one is negative, and we reverse the signs of both, then the same quotient will be obtained.

Hence we may observe the relationships that (a div b)*b+a rem b=a and therefore a/b=a div b+(a rem b)/b If we perform division by the known process described above, then, in attempting to evaluate a div b we really evaluate $$(a * (k \text{ div } b)) \text{ div } k =$$

$$(a * (k - k \text{ rem } b)/b) \text{ div } k =$$

$$(k * (a/b) - a * (k \text{ rem } b)/b) \text{ div } k =$$

$$(k * (a \text{ div } b) + k * (a \text{ rem } b)/b -$$

$$a * (k \text{ rem } b)/b) \text{ div } k$$

when we wanted (k * (a div b) ) div k=a div b.

We can rewrite the expression actually evaluated as (k * (a div b)+e) div k where e is an unknown error.

Since k * (a div b) is, by definition, a multiple of k, if e is in the range −1 to −k the expression as a whole will be in error by −1, if e is in the range 0 to k−1 the expression will be correct. If we choose k to be larger than a or b then as e is in the range a * (b−1)/b to k * (b−1) /b the error in the quotient is forced to be in the range −1 to zero. If a can take both positive and negative signs then the error can be either zero or of the opposite sign to a with a magnitude of 1.

BRIEF DESCRIPTION OF THE DRAWINGS

The invention is illustrated by way of example in the accompanying drawing, the single figure of which is a block circuit diagram of a device in accordance with the invention.

DETAILED DESCRIPTION OF THE PREFERRED EMBODIMENT

Figure 1:
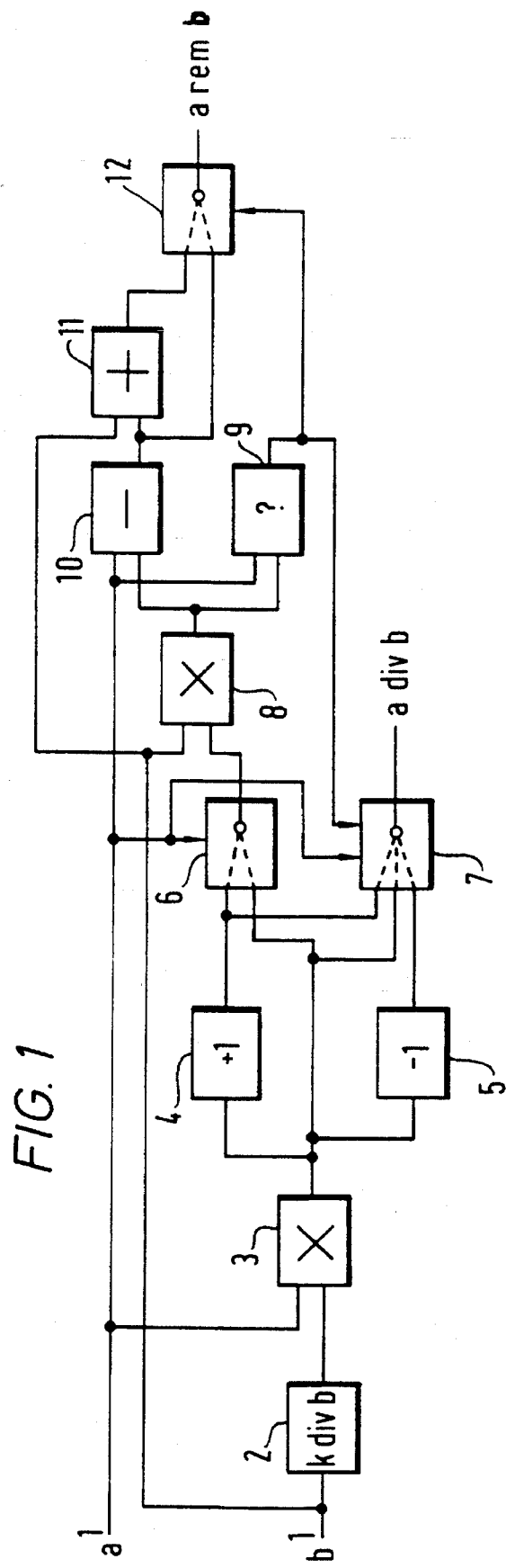

Referring to the drawing, the values for the numbers from which the division is to be formed enter via the connections 1 which are normally parallel data buses carrying binary numbers. The look up table in the read-only memory 2 is used to form the quantity k div b where k is a suitably large number which is also a power of the base to which calculations are performed. This is multiplied by a and the result divided by k in the multiplier 3 in order to form the trial quotient Q. This is either a div b or in error by no more than 1. The adders 4 and 5 are used to add +1 and −1 to Q, and therefore the correct quotient is now present at one of these. In order to determine which, the selector 6 is used to choose either Q+1 if a is positive or Q if a is negative. The result of this selection is multiplied by b in the multiplier 8 and the result compared with a in the comparator 9. The sign of a and the result of the comparison are used to control the selector 7 which operates according to the following rules.

| | |
|---|---|
| A >= 0 and A >= (Q + 1) * B | use Q + 1 |
| A >= 0 and A < (Q + 1) * B | use Q |
| A < 0 and A >= Q * B | use Q |
| A < 0 and A < Q * B | use Q − 1 |

The output of this selector is the required quantity a div b.

If required a subtraction can also be made at 10. The result of this subtraction will be related to a rem in the following way.

| A | output | Subtract | giving result |
|---|---|---|---|
| A >= 0 | Q + 1 | (Q + 1) * B − A | a rem b |
| A >= 0 | Q | (Q + 1) * B − A | a rem b − b |
| A < 0 | Q | Q * B − A | a rem b |
| A < 0 | Q − 1 | Q * B − A | a rem b − b |

The result of this subtraction is then added to b by the adder 11 and the result of the comparison is used by the selector 12 to select either the output of 10 if it is positive or 11 if it is not, thus obtaining the remainder.

I claim:

1. A digital electronic divider device for forming the quotient of two numbers a/b of a numerical system having a given base and for providing the remainder of the division of said two numbers, said device comprising: a memory means having an address input for receiving the number b and providing a look up table of precomputed quotients k/b where k is a number larger than the largest expected number b and is a power of said base; a first multiplier having a first input coupled to an output of said memory means, a second input for receiving the number a, and an output arranged to provide a value with less significant digits discarded to effect a division by the number k; first means coupled to the output of said first multiplier and having an output providing a value of the quotient a/b comprising the value from the said first multiplier with a possible rounding error added thereto; second means coupled to the output of said first multiplier and having an output providing a value of the quotient a/b comprising the value from said first multiplier with a possible rounding error subtracted therefrom; first selector switching means having first, second and third switch inputs respectively coupled to the outputs of said first multiplier, said first means and said second means and having a control input; a second selector switching means having a first switch input coupled to the output of said first multiplier, a second switch input coupled to the output of said first means and a control input coupled to receive said number a, whereby said first or second switch input is selected in accordance with the value of a; a second multiplier having a first input coupled to an output of said second selector switching means, a second input coupled to receive the number b and and output; logic means coupled to receive said numbers a and b, coupled to the output of said second multiplier and arranged to provide an output to said control input of said first selector switching means in order to cause the latter to select an appropriate value of a/b provided at one of said switch inputs; a subtractor having a first input coupled to the output of said second multiplier, having a second input coupled to receive the number a and having an output; an adder having a first input coupled to the output of said subtractor, having a second input coupled to receive the number b and having an output; and a third selector switching means having a first input coupled to the output of said subtractor, having a second input coupled to the output of said adder and having a control input coupled to an output of said logic means, whereby said third selector switching means is caused to select the value at one of its inputs as said remainder value.

2. A device according to claim 1, wherein said first and second means are arranged to provide the values Q+1, and Q−1, where Q is the output from said first multiplier, and said logic means is arranged to actuate said first selector switching means to select one of said values Q, Q+1 and Q−1 in accordance with the following rules:

Q when a>or =0 and a<(Q+1) * b or when a<0 and a>or =Q * b

Q+1 when a>or =0 and a>or =(Q+1) * B

Q−1 when a<0 and a<Q * b.

3. A digital electronic device for forming the remainder of the division of two numbers a/b of a numerical system having a given base, comprising: a memory means having an address input for receiving the number b and providing a look up table of precomputed quotients k/b where k is a number larger than the largest expected number b and is a power of said base; a first multiplier having a first input coupled to an output of said memory means and a second input for receiving the number a, and having an output providing a value with less significant digits discarded to effect a division by the number k; first adding means coupled to the output of said first multiplier and having an output providing a value of the quotient a/b comprising the value from said first multiplier with a possible rounding error added thereto; first selector switching means having a first switch input coupled to the output of said first multiplier, a second switch input coupled to the output of said first adding means and a control input coupled to receive said number a, whereby said first or second switch input is selected in accordance with the value of the number a; a second multiplier having a first input coupled to an output of said first selector switching means, a second input coupled to receive the number b and an output; a subtractor having a first input coupled to the output of said second multiplier, a second input coupled to receive the number a and an output; a second adding means having a first input coupled to the output of said subtractor, a second input coupled to receive the number b and an output; and a second selector switching means having a first input coupled to the output of said subtractor, a second input coupled to the output of said second adding means and a control input coupled to receive an input signal whereby said second selector switching means is caused to select the value at one of its inputs as the said remainder.

4. A device according to claim 3, wherein said first adding means is arranged to provide the value Q+1, where Q is the output from said first multiplier, and the said said first selector switching means is arranged to select one of said values in accordance with the following rules:

Q+1 when a>or =0

Q when a<0.

5. A device according to claim 3 wherein said control input of said second selector switching means is coupled to an output of a comparator of which a first input is coupled to the output of said second multiplier and a second input is coupled to receive said number a whereby said second selector switching means is caused to select that one of the two remainder values that is greater than zero.

* * * * *